(12) United States Patent
Barman et al.

(10) Patent No.: US 8,081,207 B2
(45) Date of Patent: Dec. 20, 2011

(54) HIGH ACCURACY STEREO CAMERA

(75) Inventors: Roderick A. Barman, Vancouver (CA); Don Murray, Vancouver (CA)

(73) Assignee: Point Grey Research Inc., Richmond (CA)

( * ) Notice: Subject to any disclaimer, the term of this patent is extended or adjusted under 35 U.S.C. 154(b) by 1231 days.

(21) Appl. No.: 11/759,181

(22) Filed: Jun. 6, 2007

(65) Prior Publication Data
US 2007/0296846 A1    Dec. 27, 2007

Related U.S. Application Data

(60) Provisional application No. 60/804,084, filed on Jun. 6, 2006.

(51) Int. Cl.
*H04N 13/02* (2006.01)

(52) U.S. Cl. ............... 348/47; 348/42; 348/45; 348/86; 348/207.99

(58) Field of Classification Search .................... 348/42, 348/45–47, 86, 87, 207.99; 359/822–831
See application file for complete search history.

(56) References Cited

U.S. PATENT DOCUMENTS

| | | | |
|---|---|---|---|
| 4,636,627 A | 1/1987 | Matsumura | |
| 5,091,793 A | 2/1992 | Goto et al. | |
| 5,130,804 A | 7/1992 | Tamura et al. | |
| 5,233,426 A * | 8/1993 | Suzuki et al. | 348/207.99 |
| 5,444,485 A | 8/1995 | Uchioke et al. | |
| 5,517,364 A | 5/1996 | Suzuki | |
| 5,825,560 A | 10/1998 | Ogura et al. | |
| 5,883,663 A * | 3/1999 | Siwko | 348/87 |
| 6,271,876 B1 * | 8/2001 | McIntyre et al. | 348/46 |
| 6,392,688 B1 | 5/2002 | Barman et al. | |
| 7,199,348 B2 * | 4/2007 | Olsen et al. | 348/220.1 |
| 2005/0267328 A1 * | 12/2005 | Blumzvig et al. | 600/109 |
| 2006/0028573 A1 * | 2/2006 | Seo et al. | 348/340 |
| 2006/0164509 A1 * | 7/2006 | Marshall et al. | 348/42 |

\* cited by examiner

*Primary Examiner* — Ramy M Osman
(74) *Attorney, Agent, or Firm* — Oyen Wiggs Green & Mutala LLP

(57) ABSTRACT

A camera system has a chassis carrying one or more cameras. Each camera has support member mounted to the chassis and an imaging chip mounted to the support member. An optical system for imaging onto the imaging chip may also be mounted to the chassis. The chassis and support members may have coefficients of thermal expansion that are substantially matched. In some embodiments the support members are located between the imaging chips and one or more circuit boards to which the imaging chips are electrically connected. In some embodiments the imaging chips are located over apertures or other channels through the chassis and light is incident on the imaging chips by way of the channels. The relative locations of the imaging chips can be maintained constant to preserve calibration for stereo imaging.

24 Claims, 8 Drawing Sheets

HIGH ACCURACY STEREO CAMERA

CROSS-REFERENCE TO RELATED APPLICATION

This application claims the benefit under 35 U.S.C. §119 of U.S. patent application No. 60/804084 filed 6 Jun. 2006 and entitled HIGH ACCURACY STEREO CAMERA, which is hereby incorporated herein by reference.

TECHNICAL FIELD

This application relates to camera systems and in particular to stereo camera systems comprising electronic light sensors.

BACKGROUND

Stereo camera systems that incorporate two or more cameras may be used to obtain three-dimensional information about the positions, orientations, configurations, and shapes of objects. Such camera systems may be used in a diverse range of fields including industrial automation, package and material handling, face recognition, traffic monitoring and the like.

U.S. Pat. No. 6,392,688 discloses a stereo camera system that has two or more electronic cameras. Each camera has an assembly comprising a light sensing array and a lens assembly which are each directly mounted to a rigid mounting member.

There is a desire to use stereo camera systems in applications that require increasing levels of precision. Very small changes in the geometry of such camera systems can have significant effects on the calibration of such systems.

SUMMARY

Non limiting embodiments of the invention are described and depicted in the drawings. This invention has a number of aspects.

One aspect of the invention provides a camera system comprising: a rigid chassis; a support member fixedly mounted to the chassis; an imaging chip mounted on the support member; and, a circuit board electrically connected to the imaging chip. The support member extends between the imaging chip and the circuit board. In embodiments the support member can hold the position and orientation of the imaging chip fixed in relation to the chassis. Preferred embodiments provide stereo camera systems that provide two or more imaging chips mounted to the chassis by way of corresponding support members.

In some embodiments, for each imaging chip, the chassis is penetrated by a channel and the support member is rigidly mounted to the chassis such that it spans the channel. In such embodiments the imaging chip may have a light-sensitive side oriented to detect light incident on the imaging chip from the channel.

In preferred embodiments the support member comprises one or more first registration features and the chassis comprises one or more second registration features and the support member is maintained in a fixed alignment with the chassis by the engagement of said first registration features with corresponding ones of said second registration features.

In preferred embodiments, the support member and the chassis have coefficients of thermal expansion that are substantially equal. This is achieved in some cases by making the chassis and support member of the same material. The material comprises a metal, such as aluminum, in some embodiments.

Another aspect of the invention provides a camera system comprising an imaging chip connected to a circuit board by a plurality of electrical connections wherein the circuit board extends parallel to the imaging chip. In preferred embodiments, two or more imaging chips are provided. A stiff support member extends between the circuit board and the imaging chip and is attached to the imaging chip. The support member is adapted for mounting to a rigid chassis.

Another aspect of the invention provides a camera system comprising a chassis comprising a body of a first material having a coefficient of thermal expansion, the chassis penetrated by a plurality of channels, the plurality of channels comprising at least first and second channels. The camera system also comprises first and second support members rigidly mounted to the chassis, the first and second support members respectively bridging the first and second channels and having a coefficient of thermal expansion substantially matched to the coefficient of thermal expansion of the material of the chassis. First and second imaging chips are respectively mounted on the first and second support members and are oriented to detect light incident from the first and second channels respectively.

Embodiments of the invention can provide multiple cameras supported on the same chassis.

Further aspects of the invention and features of example embodiments of the invention are described below.

BRIEF DESCRIPTION OF THE DRAWINGS

Exemplary embodiments are illustrated in the accompanying figures of the drawings. It is intended that the embodiments and figures disclosed herein are to be considered illustrative rather than restrictive.

DESCRIPTION

Figure 1:
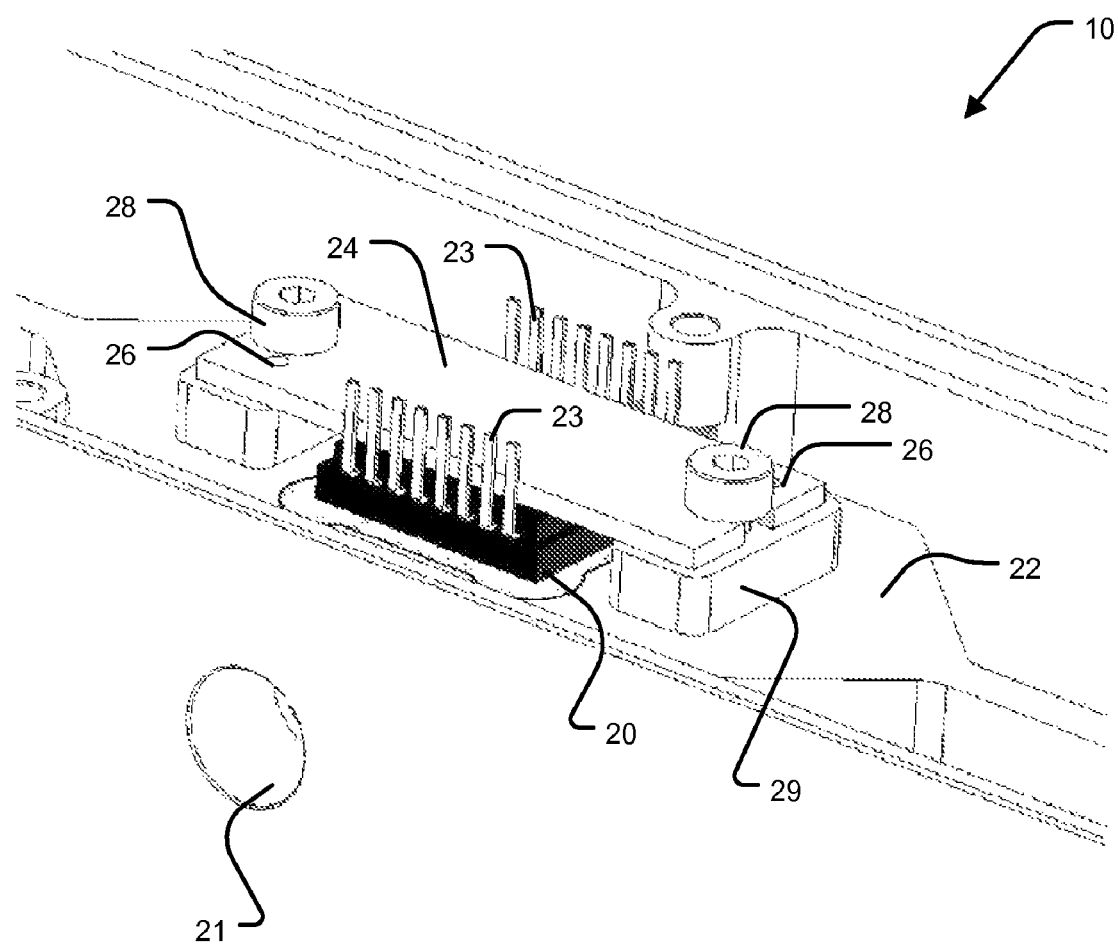
FIG. 1 is a perspective view of a stereo camera according to an embodiment of the invention that has been partially disassembled to show details of the mounting of an imaging array.
Figure 2:
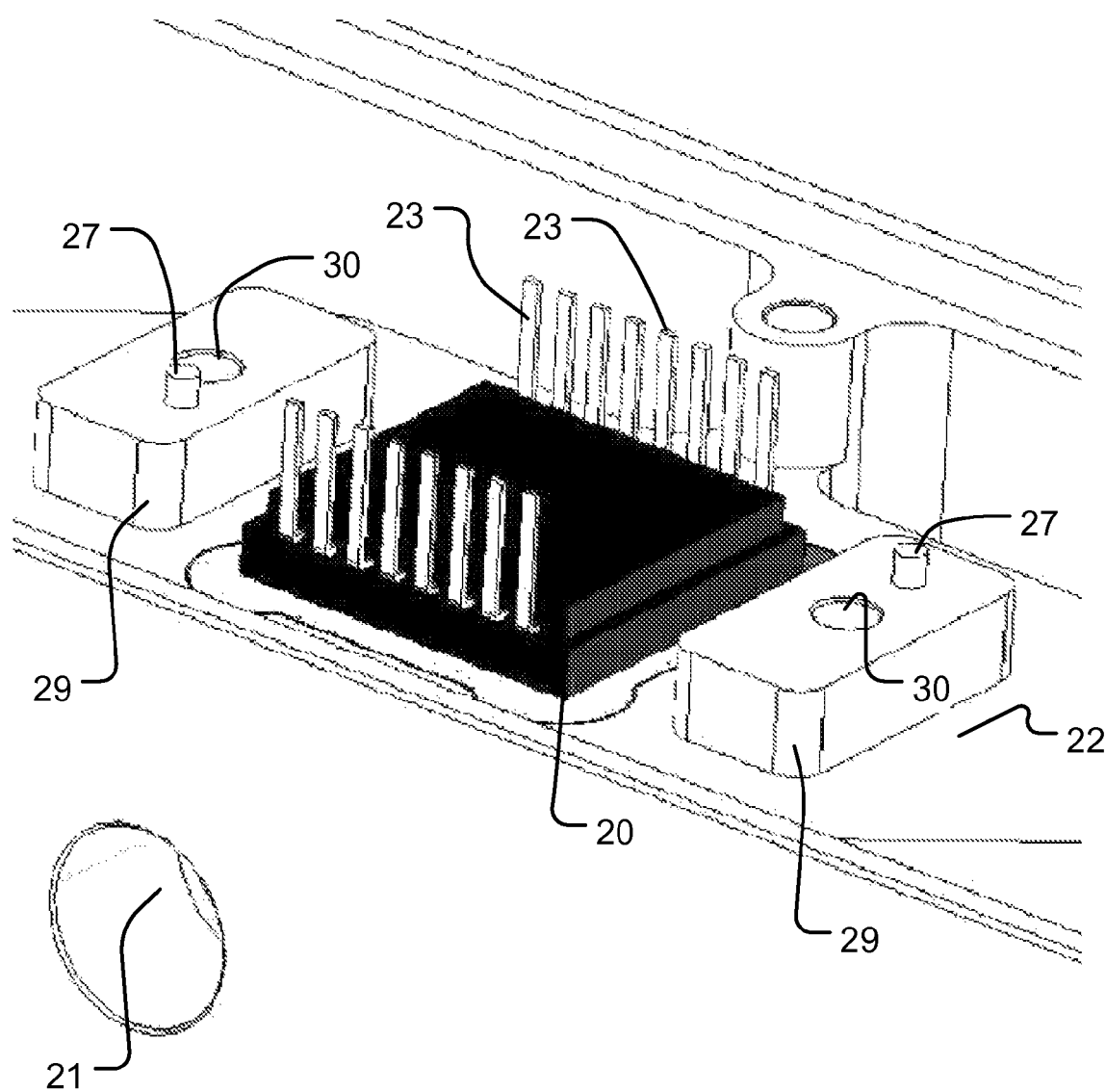
FIG. 2 is a view of the stereo camera of FIG. 1 with a mounting plate removed.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

A stereo camera system has a plurality of cameras. Each camera has an imaging array. The imaging arrays may be arrays of charge-coupled devices (CCDs) or active pixel sensors (APS) or the like. The imaging arrays are typically mounted on circuit boards. The circuit boards provide electrical power and any necessary driving signals to the imaging arrays and also carry image data away from the imaging arrays.

Shifts in the positions of the arrays relative to one another or relative to the optical systems that image a scene onto the arrays can alter the calibration of the stereo camera system. Changes in calibration can interfere with the precision with which a position, orientation, shape etc. of an object can be determined from images generated by the stereo camera.

FIGS. 1 to 7 all show parts of a stereo camera system 10 according to one specific example embodiment of the invention. Stereo camera system 10 has a plurality of cameras 12, only one of which is shown in FIGS. 1 to 7. Cameras 12 have fields of view that wholly or partially overlap to permit the acquisition of images of objects from two or more points of view. The images may be used, as is known in the art, to acquire information about the locations, orientations, shapes, or configurations of objects in three dimensions.

Each camera 12 has an imaging chip 20 containing an imaging array. Chip 20 is mounted to a rigid chassis 22, which may, for example, comprise a metal, a suitable composite material, or the like. The components of each camera 12 are mounted to chassis 22. Chassis 22 supports the components of each camera 12 so that they do not move significantly in relation to one another or to the components of other cameras 12 of stereo camera system 10. In the illustrated embodiment, a threaded aperture 21 is provided to permit camera system 10 to be supported on a tripod or other support.

Imaging chip 20 is mounted to chassis 22 by a support member 24 which passes behind imaging chip 22. Support member 24 preferably has a coefficient of expansion that is at least substantially matched (i.e. within ±10% and preferably within ±5% or even better ±1%) to that of chassis 22. Support member 24 may be made of the same material as chassis 22. Support member 24 and chassis 22 may both be made of aluminum, for example. In some embodiments, support member 24 comprises a thermally-conductive material, such as aluminum, another thermally conductive metal, or another thermally conductive material.

Support member 24 is rigid enough to add support to imaging chip 20 and to prevent imaging chip 20 from shifting (translating or rotating). In the illustrated embodiment, support member 24 is thin so that it can fit between imaging chip 20 and a circuit board 50 (described below) to which imaging chip 20 is connected by pins 23.

Imaging chip 20 is affixed to support member 24. For example, imaging chip 20 may be adhered to support member 24 with a suitable adhesive (not shown). The adhesive may optionally have a high thermal conductivity to assist in maintaining thermal equilibrium between imaging chip 20 and chassis 22 and to help to dissipate any heat generated by imaging chip 20. In the alternative, imaging chip 20 may be clamped to support member 24 by means of one or more clamps that do not obstruct light from reaching imaging chip 20 to create an image thereon.

Support member 24 is rigidly fixed to chassis 22 by a mechanism that establishes a positive engagement between chassis 22 and support member 24 and thereby prevents the position or orientation of support member 24 from changing relative to chassis 22. The mechanism may comprise registration features on support member 24 that enter registering engagement with corresponding registration features on or mounted to chassis 22. In the illustrated embodiment, support member 24 has holes 26 that receive registration pins 27 that project from chassis 22. Registration pins 27 are a precision fit in holes 26 so that member 24 cannot move longitudinally or transversely or rotate relative to chassis 22 after registration pins 27 are engaged in holes 26.

Support member 24 is held down by screws 28 that engage threaded holes 30 and thereby keep support member 24 in engagement with registration pins 27.

There are a wide variety of alternative positive engagement mechanisms that could be applied to keep support member 24 at a fixed location and orientation relative to chassis 22. For example, registration pins on support member 24 could engage holes in chassis 22 or support member 24 could be clamped against suitable registration edges, or the like.

In the example shown in FIG. 1, support member 24 is shaped so that it does not interfere with pins 23 of imaging chip 20. In the illustrated embodiment, the body of support member 24 passes between rows of pins 23. In alternative embodiments, pins 23 pass through apertures in support member 24.

In the illustrated embodiment, support member 24 extends in a bridge like manner between two elevated pads 29. Each elevated pad 29 has a registration feature (e.g. a registration pin 27) and a threaded hole 30 to receive a screw 29. Pads 29 are on either side of a channel 31 through chassis 22 that provides an optical path for camera 12. Support member 24 bridges channel 31.

Figure 3:
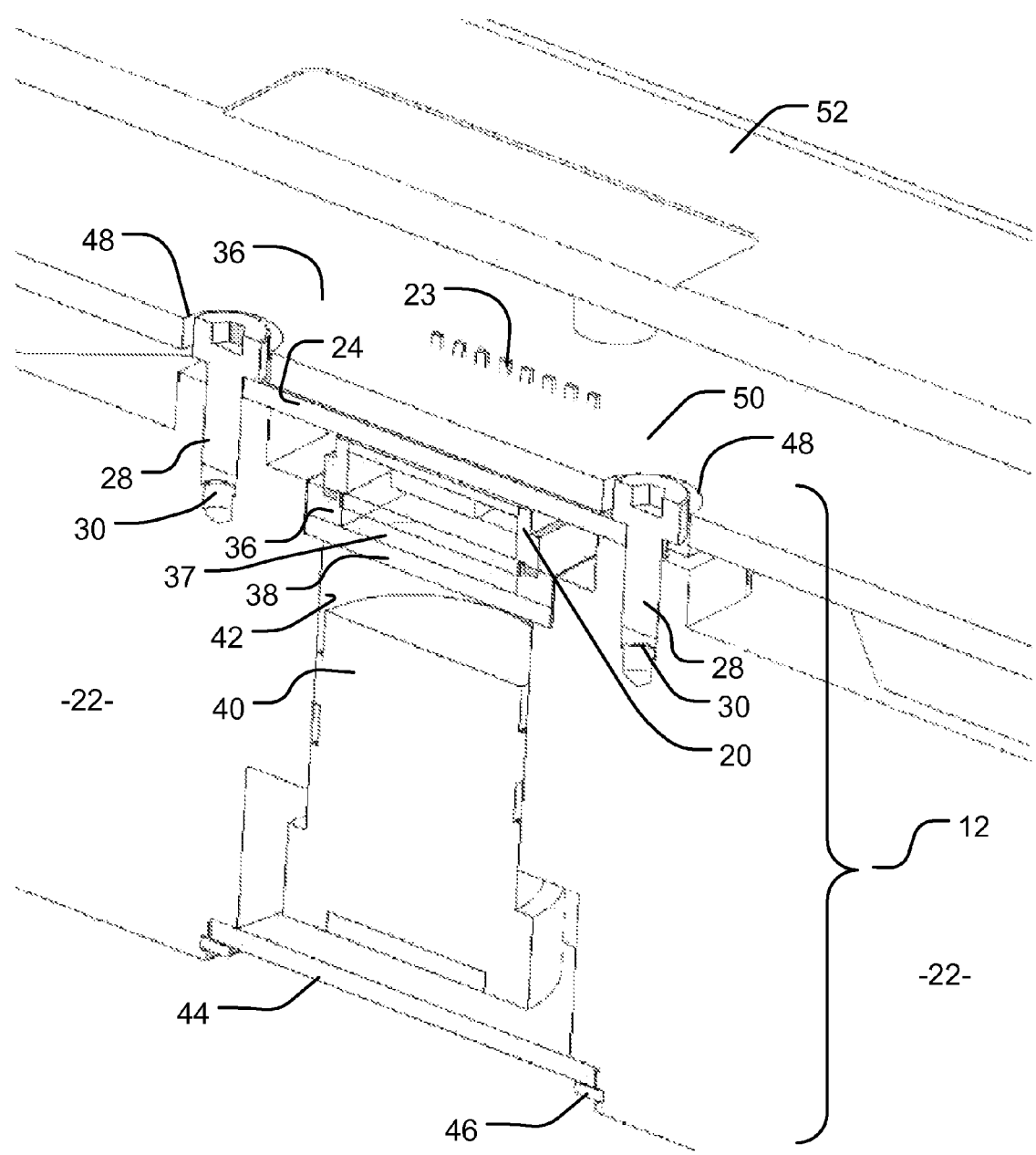
FIG. 3 is a view of the stereo camera of FIG. 1 cut away to show the optical path of one camera.
Figure 4:
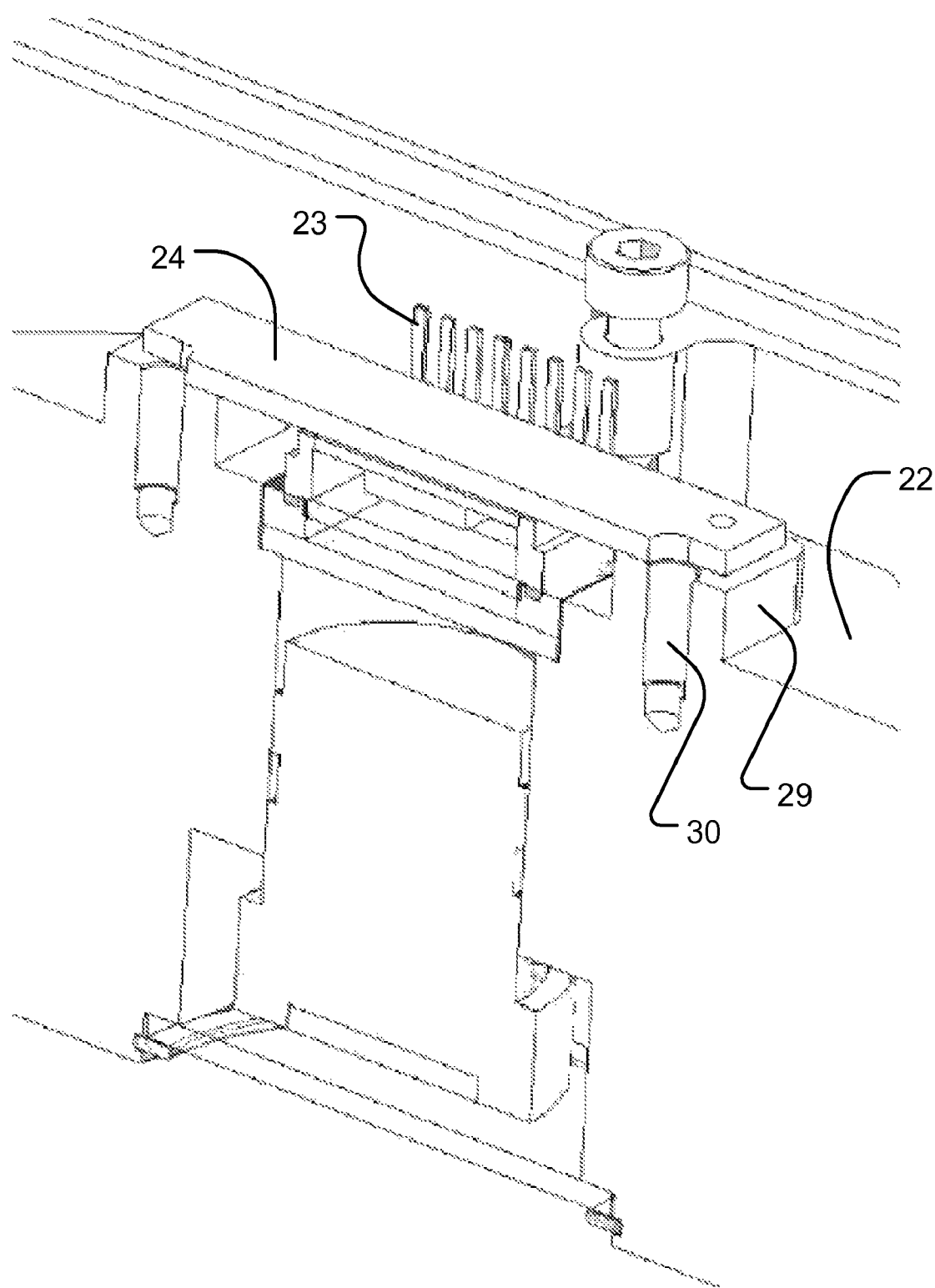
FIG. 4 is a view like that of FIG. 3 with a circuit board removed to better show mounting of an imaging array.
Figure 5:
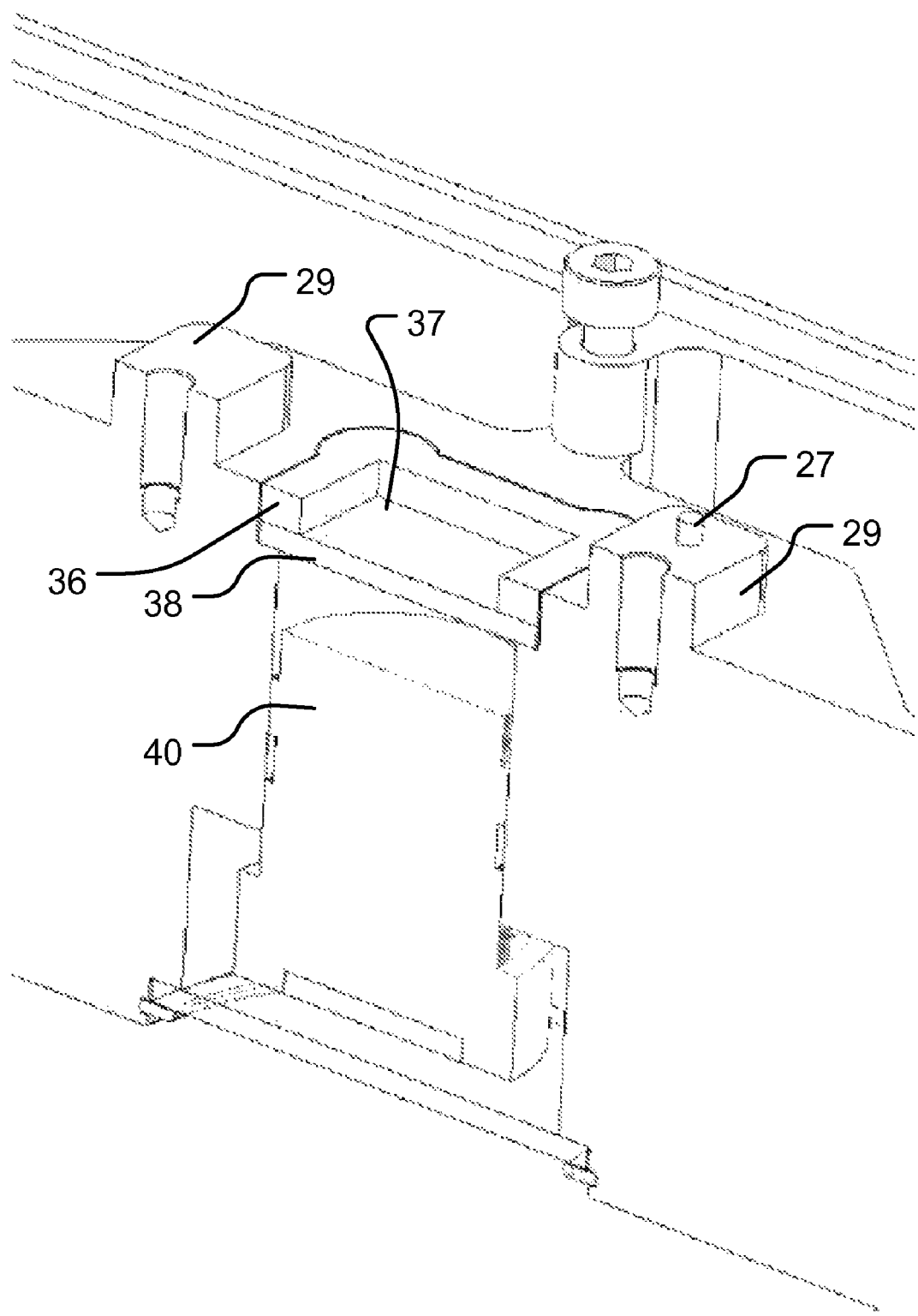
FIG. 5 is a view like that of FIG. 3 with the imaging array and associated electronics removed to show an internal viewing window.
Figure 5A:
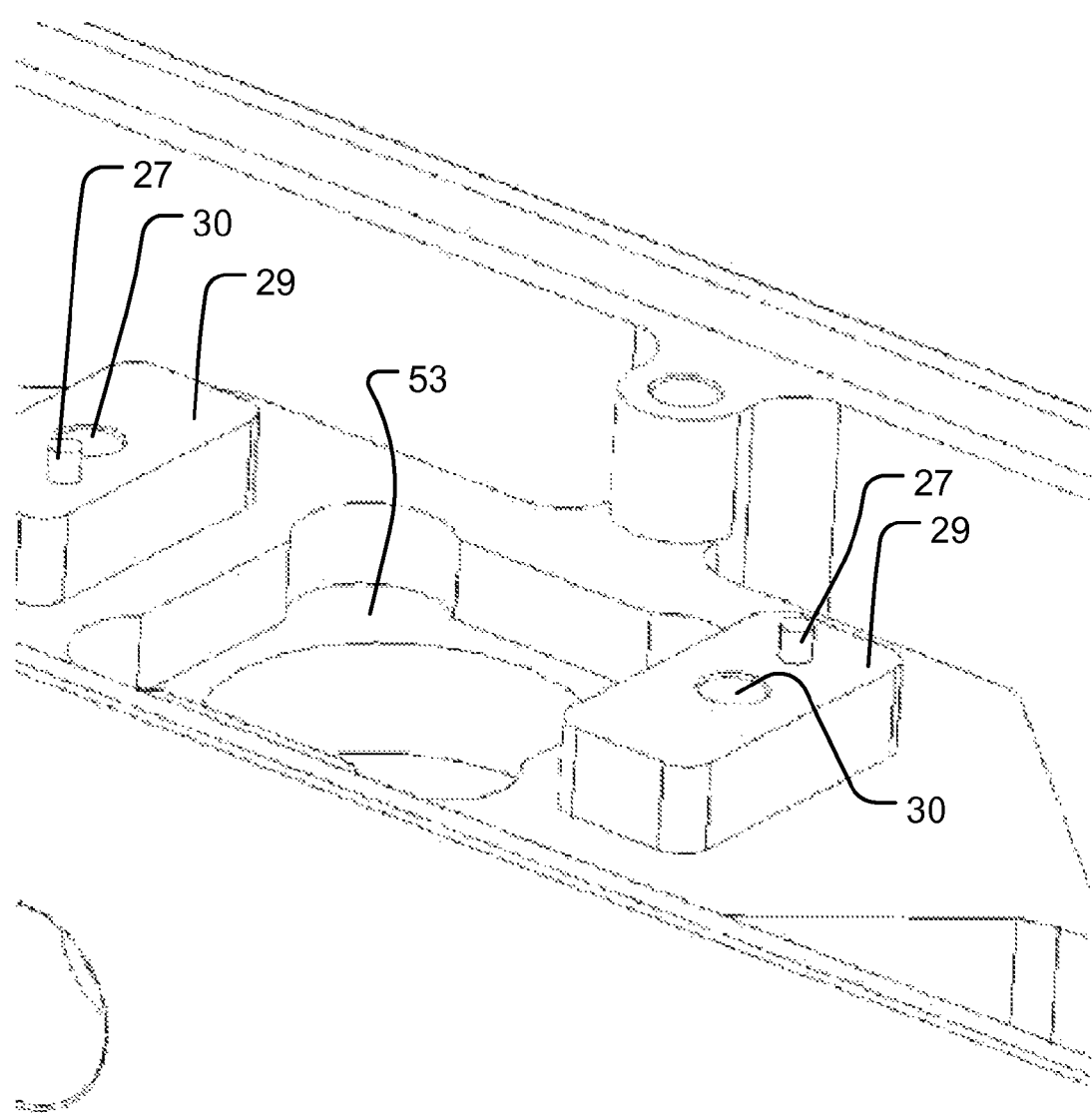
FIG. 5A is a detail view showing a configuration of a location for receiving an imaging array.
Figure 6:
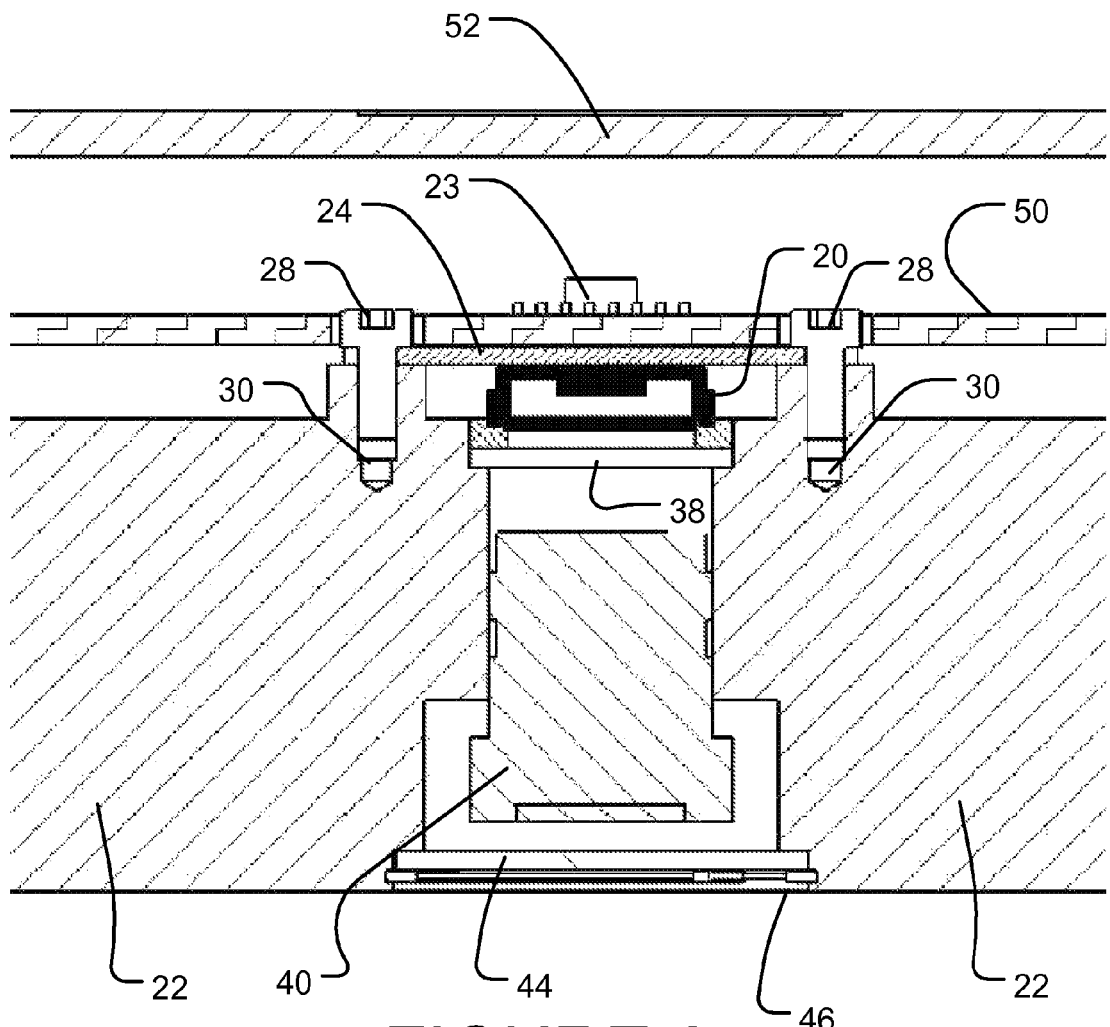
FIG. 6 is a cross section of a camera like that shown in FIG. 3.
Figure 7:
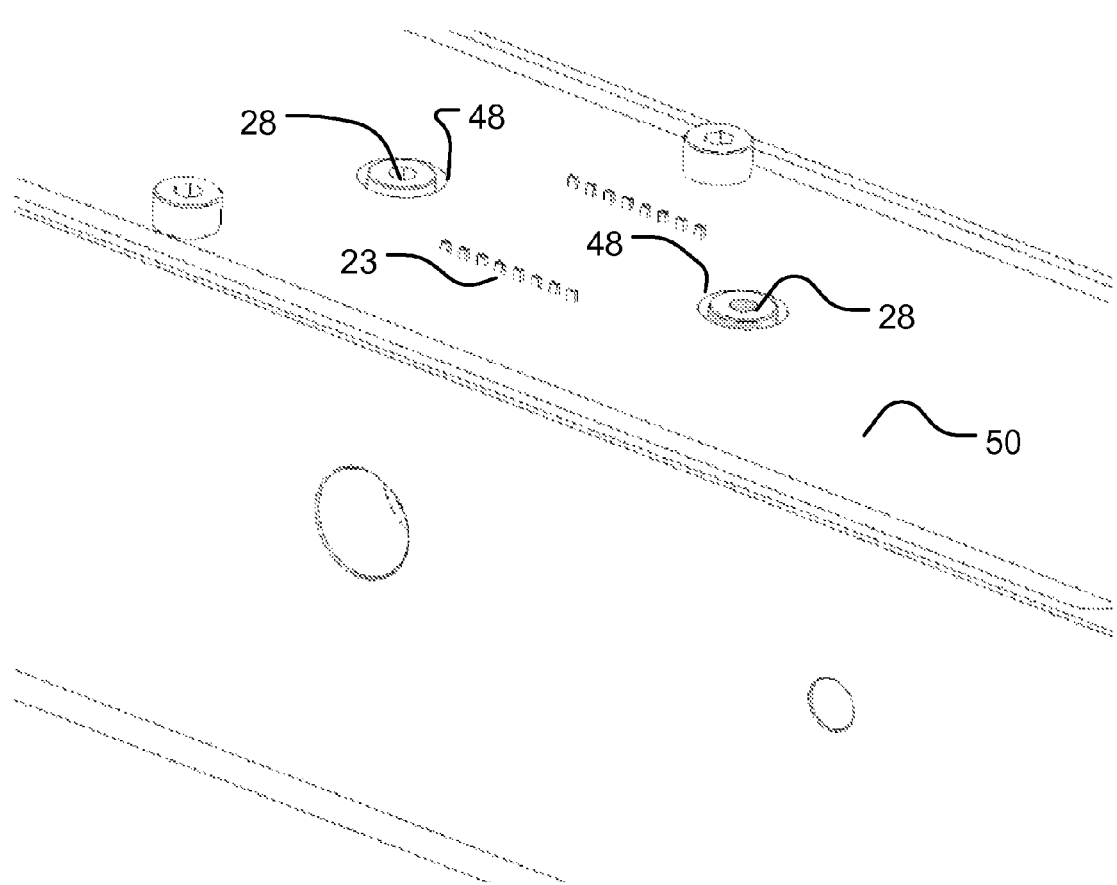
FIG. 7 is a partial perspective view showing the stereo camera system of FIG. 1 with a rear cover removed to show a circuit board to which an imaging array is mounted.

As shown in FIG. 3, pins 23 of imaging chip 20 connect to a circuit board 50. In preferred embodiments, imaging chip 20 is affixed to support member 24 and the combination of imaging chip 20 and support member 24 is connected to circuit board 50 at least by way of pins 23. The resulting assembly can then be connected to chassis 22 by engaging registration pins 27 in corresponding holes 26 of support member 24 and then inserting screws 28. In the illustrated embodiment, circuit board 50 has cutouts 48 to accept the heads of screws 28.

Two or more cameras 12 may be mounted to the same circuit board 50. Each camera 12 may have a separate imaging chip 20 and support member 24. This construction permits the convenience of making a stereo camera system 10 in which a single circuit board 50 provides electronics for multiple cameras 12 while providing positive registration of each imaging chip 20 relative to chassis 22. Even if circuit board 50 deforms or moves as a result of thermal effects or other factors, support members 24 hold imaging chips 22 in their desired positions relative to chassis 22. In other embodiments, each camera 12 has a separate circuit board 50.

In the illustrated embodiment, the light-sensing side of imaging chip 20 receives light through a window 38. A seal 36 is disposed between imaging chip 20 and window 38. A chamber 37 is defined between imaging chip 20 and window 38. Seal 36 prevents dust from entering chamber 37 and thereby protects imaging chip 20. Window 38 and seal 36 may be disposed in a recess 53 that has been milled or otherwise formed in chassis 22.

A lens assembly 40 is mounted within a bore 42 defined in chassis 22. The position of lens assembly 40 along bore 42 may be adjustable to allow for focusing of camera 12. Another window 44 is provided to cover the end of lens assembly 40. Window 44 is secured by a spring clip 46 or other suitable fastening arrangement. A back cover 52 covers the back side of camera system 10.

While a number of exemplary aspects and embodiments have been discussed above, those of skill in the art will recognize certain modifications, permutations, additions and sub-combinations thereof. For example:

Cameras 12 may be arranged in a line or in any other suitable manner. In some embodiments, three cameras 12 are arranged at vertices of a triangle. In other embodiments, two cameras 12 are provided, with one of the cameras 12 located toward either end of an elongated chassis 22. Multiple cameras may be arranged, for example, as disclosed in U.S. Pat. No. 6,392,688.

Support members 24 are not necessarily separate from imaging chips 20. A manufacturer of imaging chips 20 could make imaging chips 20 having integral support members 24 that include accurate holes or other registration features capable of interfacing with corresponding registration features on chassis 22. A statement that a support member 24 is "attached" to an imaging chip 20 encompasses situations where the support member is integrated with the imaging chip 20 as well as situations where the support member and imaging chip are held together by an adhesive, mechanical clamp, or other mechanism that holds the imaging chip from moving relative to the support member.

In order to inhibit the likelihood of static discharges that could adversely affect the performance of imaging chip 20, in some embodiments, support member 24 is electrically insulated from circuit board 50 by a layer of a suitable electrically insulating material.

Where a component (e.g. a chassis, lens, window, member, pin, circuit board, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

It is therefore intended that the invention be interpreted as having a broad scope that can include all such modifications, permutations, additions and sub-combinations. The disclosed features may be combined with one another in any suitable manner. The particular combinations described above and shown in the drawings are meant only to illustrate the invention and not to limit it.

What is claimed is:

1. A camera system comprising:
   a rigid chassis;
   a first support member fixedly mounted to the chassis;
   a first imaging chip mounted on the first support member;
   a second support member fixedly mounted to the chassis;
   a second imaging chip mounted on the second support member; and,
   a circuit board electrically connected to at least one of the first and second imaging chips;
   wherein the first and second imaging chips are spaced apart from one another and at least one of the first and second support members extends between the corresponding imaging chip and the circuit board.

2. A camera system according to claim 1 wherein the chassis is penetrated by first and second channels, the first and second support members are rigidly mounted to the chassis such that they respectively span the first and second channels and the first and second imaging chips have light-sensitive sides oriented to detect light incident on the first and second imaging chips from the first and second channels respectively.

3. A camera system according to claim 2 wherein the first and second support members each extend between a plurality of raised pads projecting from the chassis.

4. A camera system according to claim 2 wherein each of the first and second support members comprises one or more first registration features and the chassis comprises one or more second registration features and wherein each of the first and second support members is maintained in a fixed alignment with the chassis by the engagement of the corresponding first registration features with corresponding ones of the second registration features.

5. A camera system according to claim 2 wherein the first and second support members are respectively integrated with the first and second imaging chips.

6. A camera system according to claim 2 comprising an optical system that focuses light to form images on the first and second imaging chips wherein the optical system is mounted to the chassis.

7. A camera system according to claim 6 wherein the first and second channels comprises bores defined in the chassis and the optical system comprises optical components mounted within the bores.

8. A camera system according to claim 7 wherein the bores are threaded and the components are threadedly engaged with the threads of the bores.

9. A camera system according to claim 2 wherein the chassis comprises a unitary slab of metal that is penetrated by the first and second channels.

10. A camera system according to claim 2 wherein the channels each comprise an aperture in the chassis and the camera system comprises an optically-transparent window extending across each of the apertures to define a volume sealed against entry of dust between the window and a light-sensitive face of the corresponding imaging chip.

11. A camera system according to claim 1, wherein the first and second support members and the chassis have coefficients of thermal expansion that are substantially equal.

12. A camera system according to claim 11, wherein the first and second support members each comprise a strip of metal.

13. A camera system according to claim 12, wherein the chassis is made of metal.

14. A camera system according to claim 13, wherein the strips of metal of the first and second support members and the chassis are all made of the same metal.

15. A camera system according to claim 12, comprising a layer of electrically-insulating material disposed between the circuit board and the at least one of the first and second support members.

16. A camera system according to claim 1 wherein at least one of the imaging chips comprises a plurality of pins, the pins provide electrical contact between the circuit board and the at least one of the imaging chips, and at least some of the pins extend through apertures in the support member to which the at least one of the imaging chips is mounted.

17. A camera system according to claim 1 wherein at least one of the imaging chips comprises a plurality of pins, the pins provide electrical contact between the circuit board and the at least one of the imaging chips, the pins are arranged in a plurality of rows and at least a portion of the support member to which the at least one of the imaging chips is mounted extends between two rows of the plurality of rows.

18. A camera system according to claim 1 wherein the circuit board constitutes a first circuit board, the first support member extends between the first imaging chip and the first circuit board, and the second support member extends between the second imaging chip and a second circuit board.

19. A camera system according to claim 18 wherein the first and second imaging chips are coplanar, the first and second support members are coplanar, the first and second circuit boards are coplanar, the first imaging chip, first support member and first circuit board are all parallel to one another.

20. A camera system according to claim 1 wherein the first support member extends between the first imaging chip and the circuit board and the second support member extends between the second imaging chip and the circuit board.

21. A camera system according to claim 1 comprising three or more imaging chips mounted to the chassis at spaced apart locations, the three or more imaging chips including the first and second imaging chips.

22. A camera system comprising:
   first and second imaging chips connected to one or more circuit boards by a plurality of electrical connections wherein the one or more circuit boards extend parallel to the first and second imaging chips; and,
   a first stiff support member extending between the first imaging chip and a circuit board of the one or more circuit boards to which the first imaging chip is electrically connected, wherein the first imaging chip is attached to the first support member;
   a second stiff support member extending between the second imaging chip and a circuit board of the one or more circuit boards to which the second imaging chip is electrically connected, wherein the second imaging chip is attached to the second support member; and,
   wherein the first and second support members are adapted for mounting to a rigid chassis at spaced apart locations.

23. A camera system according to claim 22 wherein the first and second support members each comprise a strip of thermally-conductive material.

24. A camera system comprising:
   a chassis comprising a body of a first material having a coefficient of thermal expansion, the chassis penetrated by a plurality of channels, the plurality of channels comprising at least first and second channels;
   first and second support members rigidly mounted to the chassis, the first and second support members respectively bridging the first and second channels and having a coefficient of thermal expansion substantially matched to the coefficient of thermal expansion of the material of the chassis;
   first and second imaging chips respectively mounted on the first and second support members and oriented to detect light incident from the first and second channels respectively.

* * * * *